(12) United States Patent
Hsu et al.

(10) Patent No.: US 10,863,346 B2
(45) Date of Patent: Dec. 8, 2020

(54) WIRELESS PROFILE SHARING METHOD

(71) Applicant: REALTEK SEMICONDUCTOR CORPORATION, Hsinchu (TW)

(72) Inventors: Chin-Yu Hsu, Zhubei (TW); Meng-Shin Lee, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/855,140

(22) Filed: Apr. 22, 2020

(65) Prior Publication Data

US 2020/0344593 A1 Oct. 29, 2020

(30) Foreign Application Priority Data

Apr. 23, 2019 (TW) .................................. 108114064

(51) Int. Cl.
*H04W 8/18* (2009.01)
*H04W 48/14* (2009.01)
(Continued)

(52) U.S. Cl.
CPC ............ *H04W 8/183* (2013.01); *H04W 48/14* (2013.01); *H04W 76/14* (2018.02); *H04W 76/30* (2018.02); *H04W 84/12* (2013.01)

(58) Field of Classification Search
CPC ..... H04W 8/183; H04W 48/14; H04W 76/14; H04W 76/30; H04W 84/12
See application file for complete search history.

(56) References Cited

U.S. PATENT DOCUMENTS 8,077,684 B2 * 12/2011 Tchigevsky ........... H04W 84/12
370/338
8,787,572 B1 7/2014 Tewari et al.
(Continued)

OTHER PUBLICATIONS

OA letter of the counterpart TW application (appl. No. 108114064) dated Apr. 17, 2020. Summary of the OA letter: 1. Claims 1, 2, 4, 5, 7, 8, and 10 are rejected as being unpatentable over the cited reference 1 (US 2017/0034215A1) in view of the cited reference 2 (US 2016/0212695A1). 2. Claims 3, 6, and 9 are rejected as being unpatentable over the cited reference 1 in view of the cited reference 2 and further in view of the cited reference 3 (US 8787572B1).

*Primary Examiner* — Dominic E Rego
(74) *Attorney, Agent, or Firm* — WPAT, PC

(57) ABSTRACT

Disclosed is a method feasible for a hidden non-ASCII SSID. The method is carried out by a to-be-set wireless device and includes: broadcasting a beacon signal carrying predetermined data detectable to an already-set wireless device; wirelessly connecting to the already-set wireless device; receiving the profile data of a target wireless device from the already-set wireless device and then wirelessly disconnecting the already-set wireless device, wherein the SSID of the target wireless device is a hidden non-ASCII SSID; acquiring packets for establishment of connection between the already-set wireless device and the target wireless device according to the profile data; obtaining the raw data of the SSID according to the content of the packets and then connecting to the target wireless device according to the profile data and the raw data; and transmitting a connection success message to the already-set wireless device via the target wireless device.

20 Claims, 4 Drawing Sheets

(51) Int. Cl.
*H04W 76/14* (2018.01)
*H04W 76/30* (2018.01)
*H04W 84/12* (2009.01)

(56) References Cited

U.S. PATENT DOCUMENTS

| | | | | |
|---|---|---|---|---|
| 9,002,394 | B2* | 4/2015 | Jang | H04W 76/14 455/517 |
| 9,532,394 | B2* | 12/2016 | Seo | H04W 24/08 |
| 9,924,472 | B2* | 3/2018 | Kawasaki | H04W 52/241 |
| 10,334,570 | B2* | 6/2019 | Caretti | H04W 76/14 |
| 10,517,098 | B2* | 12/2019 | Geirhofer | H04W 72/082 |
| 10,536,985 | B2* | 1/2020 | Yamazaki | H04L 25/0202 |
| 2005/0050318 | A1* | 3/2005 | Alone | H04L 63/0428 713/155 |
| 2007/0274275 | A1* | 11/2007 | Laroia | H04W 52/0229 370/338 |
| 2010/0002666 | A1* | 1/2010 | Mukai | H04W 36/0016 370/338 |
| 2011/0319012 | A1* | 12/2011 | Park | H04B 7/155 455/7 |
| 2012/0185605 | A1* | 7/2012 | Patil | H04W 76/14 709/228 |
| 2014/0013658 | A1* | 1/2014 | Silverman | C12P 5/00 44/308 |
| 2014/0321314 | A1* | 10/2014 | Fodor | H04W 24/10 370/252 |
| 2014/0328299 | A1* | 11/2014 | Kalhan | H04W 72/042 370/329 |
| 2015/0094057 | A1* | 4/2015 | Lu | H04W 16/30 455/434 |
| 2015/0111587 | A1* | 4/2015 | Kalhan | H04W 72/04 455/450 |
| 2015/0146633 | A1* | 5/2015 | Kalhan | H04L 1/1607 370/329 |
| 2015/0163842 | A1* | 6/2015 | Kalhan | H04W 84/18 455/500 |
| 2015/0223277 | A1* | 8/2015 | Jovicic | H04W 76/14 455/41.2 |
| 2015/0237663 | A1* | 8/2015 | Wilhelmsson | H04W 76/14 455/450 |
| 2015/0351059 | A1* | 12/2015 | Seo | H04W 56/002 370/350 |
| 2016/0021693 | A1* | 1/2016 | Doetsch | H04W 72/042 370/329 |
| 2016/0212695 | A1 | 7/2016 | Lynch et al. | |
| 2016/0262111 | A1* | 9/2016 | Boudreau | H04W 76/10 |
| 2017/0006630 | A1* | 1/2017 | Wang | H04W 72/1289 |
| 2017/0034215 | A1 | 2/2017 | Sigel et al. | |
| 2017/0251485 | A1* | 8/2017 | Kalhan | H04W 72/087 |
| 2018/0007724 | A1* | 1/2018 | Kazmi | H04W 8/005 |
| 2019/0068342 | A1* | 2/2019 | Kumar Parameswarn Rajamma | H04W 76/14 |

* cited by examiner

WIRELESS PROFILE SHARING METHOD

BACKGROUND OF THE INVENTION

1. Field of the Invention

The present disclosure relates to a method, especially to a method feasible for a hidden SSID.

2. Description of Related Art

As the IoT (Internet of Things) technology continues to develop, the utilization of wireless network devices is more and more common. In addition to personal computers and mobile devices (e.g., mobile phones), articles for daily use such as toys, refrigerators, lamps, and speakers also adopt the wireless networking technology. Most of the above-mentioned articles (hereafter called "to-be-set wireless devices") acquire the information for accessing network through the following method: an already-set device (e.g., a personal computer or a mobile device) executing an application program to transmit the profile data of a target wireless device (e.g., an access point) to a to-be-set wireless device in a designed manner; and after the to-be-set wireless device receives the profile data of the target wireless device, the to-be-set wireless device using the profile data to connect to the target wireless device. However, if the SSID (service set identifier) of the target wireless device is hidden and the SSID is not an ASCII (American Standard Code for Information Interchange) code, the aforementioned method is unable to help the to-be-set wireless device acquire the profile data of the target wireless device successfully.

SUMMARY OF THE INVENTION

An object of the present disclosure is to disclose a wireless profile sharing method feasible for a hidden SSID.

Another object of the present disclosure is to disclose a wireless profile sharing method feasible for a hidden non-ASCII SSID.

An embodiment of the wireless profile sharing method of the present disclosure is for a plurality of wireless devices including a target wireless device (e.g., an access point), a first wireless device (e.g., a mobile device or a personal computer), and a second wireless device (e.g., a wireless network device such as a wireless speaker or an IoT device). This embodiment includes the following steps: wirelessly connecting by the first wireless device to the target wireless device, while a service set identifier (SSID) of the target wireless device being hidden; executing, by the first wireless device, an application program to acquire profile data of the target wireless device; broadcasting, by the second wireless device, a beacon signal carrying predetermined data; receiving the beacon signal and recognizing the predetermined data by the first wireless device; wirelessly disconnecting the target wireless device and then wirelessly connecting to the second wireless device by the first wireless device; transmitting the profile data of the target wireless device to the second wireless device and then wirelessly disconnecting the second wireless device by the first wireless device; repeating by the first wireless device a procedure for wirelessly connecting to the target wireless device and disconnecting by the first wireless device the target wireless device N time(s) so as to allow the second wireless device to acquire a plurality of packets in accordance with the profile data of the target wireless device, while the plurality of packets being used for establishment of connection between the first wireless device and the target wireless device and the N being a positive integer; and obtaining by the second wireless device raw data of the SSID according to content of the plurality of packets and then wirelessly connecting by the second wireless device to the target wireless device according to the profile data of the target wireless device and the raw data of the SSID. In an exemplary implementation of this embodiment, the second wireless device transmits a connection success message to the first wireless device via the target wireless device. In another exemplary implementation of this embodiment, the hidden SSID of the target wireless device is not an ASCII code.

Another embodiment of the wireless profile sharing method of the present disclosure is carried out by a first wireless device (e.g., a mobile device or a personal computer). This embodiment includes the following steps: wirelessly connecting to a target wireless device (e.g., an access point) having a hidden SSID; acquiring profile data of the target wireless device through an application program; receiving a beacon signal from a second wireless device (e.g., a wireless network device such as a wireless speaker or an IoT device) and recognizing predetermined data carried by the beacon signal; wirelessly disconnecting the target wireless device and then wirelessly connecting to the second wireless device; transmitting the profile data of the target wireless device to the second wireless device and then wirelessly disconnecting the second wireless device; and repeating a procedure for wirelessly connecting to the target wireless device and disconnecting the target wireless device N times so as to allow the second wireless device to acquire a plurality of packets in accordance with the profile data of the target wireless device, wherein the plurality of packets are used for establishment of connection between the first wireless device and the target wireless device and the N is a positive integer. In an exemplary implementation of this embodiment, the first wireless device receives a connection success message from the second wireless device via the target wireless device. In another exemplary implementation of this embodiment, the hidden SSID of the target wireless device is not an ASCII code.

A further embodiment of the wireless profile sharing method of the present disclosure is carried out by a second wireless device (e.g., a wireless network device such as a wireless speaker or an IoT device). This embodiment includes the following steps: broadcasting a beacon signal carrying predetermined data detectable to a first wireless device; wirelessly connecting to the first wireless device; receiving profile data of a target wireless device from the first wireless device and then wirelessly disconnecting the first wireless device, wherein an SSID of the target wireless device is hidden; acquiring a plurality of packets in accordance with the profile data of the target wireless device, wherein the plurality of packets are used for establishment of connection between the first wireless device and the target wireless device; and obtaining raw data of the SSID according to content of the plurality of packets and then wirelessly connecting to the target wireless device according to the profile data of the target wireless device and the raw data of the SSID. In an exemplary implementation of this embodiment, the second wireless device transmits a connection success message to the first wireless device via the target wireless device. In another exemplary implementation of this embodiment, the SSID of the target wireless device is not an ASCII code.

These and other objectives of the present disclosure will no doubt become obvious to those of ordinary skill in the art

DETAILED DESCRIPTION OF THE PREFERRED EMBODIMENTS

The present disclosure discloses a wireless profile sharing method capable of allowing a to-be-set wireless device to connect to a target wireless device having a hidden SSID (service set identifier) even through the hidden SSID is not an ASCII (American Standard Code for Information Interchange) code.

Figure 1:
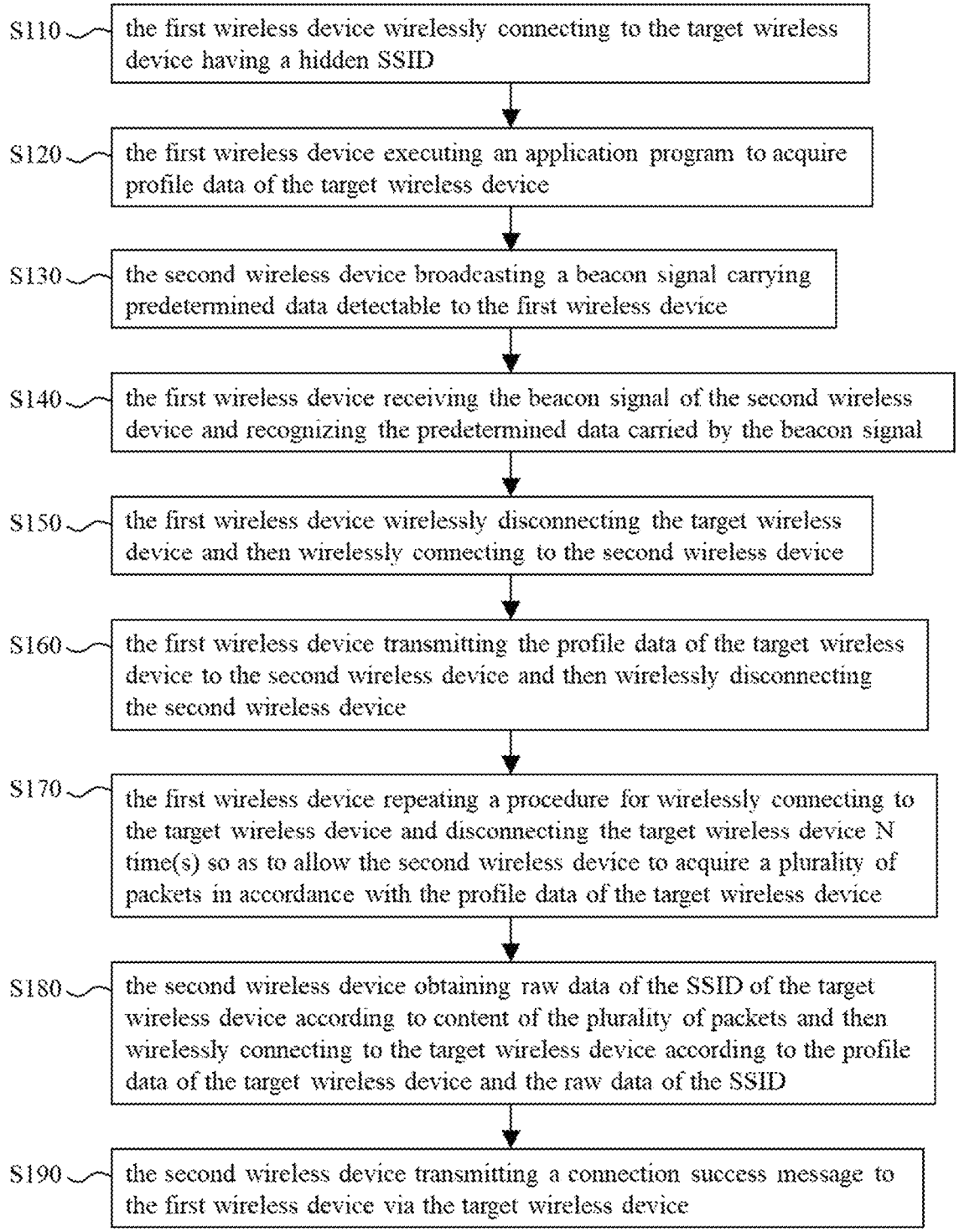
FIG. 1 shows an embodiment of the wireless profile sharing method of the present disclosure.
Figure 2:
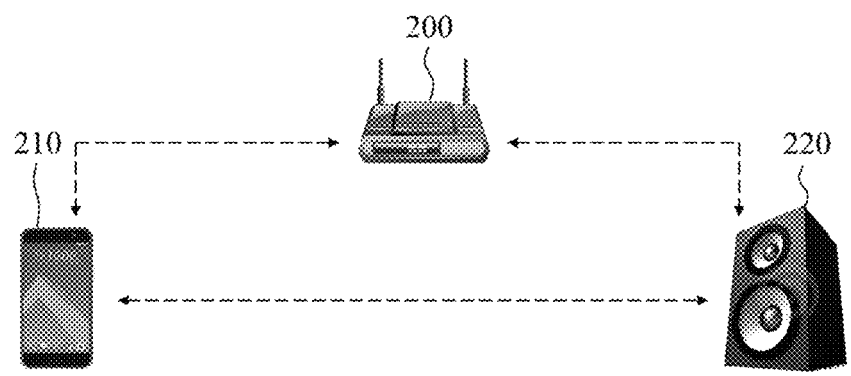
FIG. 2 shows an embodiment of the plurality of wireless devices of FIG. 1.

FIG. 1 shows an embodiment of the wireless profile sharing method of the present disclosure. This embodiment is carried out by a plurality of wireless devices. FIG. 2 shows an embodiment of the plurality of wireless devices including a target wireless device 200, a first wireless device 210, and a second wireless device 220. For instance, the target wireless device 200 is an AP (access point) or a wireless device capable of functioning as an AP; the first wireless device 210 (e.g., a mobile phone or a personal computer) already has the profile data of the target wireless device 200 and connects to the target wireless device 200; the second wireless device 220 (e.g., a wireless network device such as a wireless speaker or an IoT (Internet of Things) device) does not have the profile data of the target wireless device 200 until it receives the profile data of the target wireless device 200 from the first wireless device 210. For another instance, the plurality of wireless devices are Wi-Fi devices conforming to at least one of a series of IEEE 802.11 standards (e.g., 802.11a, 802.11b, 802.11g, 802.11n, 802.11ac, 802.11ax).

Please refer to FIG. 1 and FIG. 2. The embodiment of FIG. 1 includes the follow steps:

step S110: the first wireless device 210 wirelessly connecting to the target wireless device 200, wherein the SSID of the target wireless device 200 is hidden. In an exemplary implementation, the target wireless device 200 broadcasts a beacon signal without any valid SSID; in other words, the beacon signal of the target wireless device 200 does not include the SSID of the target wireless device 200. In another exemplary implementation, the SSID of the target wireless device 200 is a hidden non-ASCII SSID.

step S120: the first wireless device 210 executing an application program to acquire profile data of the target wireless device 200. In an exemplary implementation, the profile data includes: a basic service set identifier (BSSID) (e.g., a media access control address (MAC address)) of the target wireless device 200; information indicating that the SSID of the target wireless device 200 is hidden; and a connection password of the target wireless device 200, which allows a wireless device to establish a wireless connection with the target wireless device 200. It should be noted that in a normal circumstance the profile data acquired by the application program are coded data (e.g., UTF-8 (8-bit Unicode Transformation Format) data) encoded by the first wireless device 210 while the application program is not authorized to obtain the raw data (e.g., GB2312 (a character set for simplified Chinese characters, used in the People's Republic of China) data or GBK (an extension of the GB2312 character set for simplified Chinese characters, used in the People's Republic of China) data) of the profile data. Therefore, if the SSID of the target wireless device 200 is a hidden non-ASCII SSID, even though the first wireless device 210 executes the application program to provide the coded data of the SSID for the second wireless device 220, the second wireless device 220 is still unable to connect to the target wireless device 200 according to the coded data of the SSID.

step S130: the second wireless device 220 broadcasting a beacon signal carrying predetermined data detectable to the first wireless device 210. In an exemplary implementation, the predetermined data is an SSID conforming to a specific protocol which is a known or self-developed protocol and recognizable to both the first wireless device 210 and the second wireless device 220.

step S140: the first wireless device 210 receiving the beacon signal of the second wireless device 220 and recognizing the predetermined data carried by the beacon signal. In an exemplary implementation, the first wireless device 210 receives one or more broadcast signals, determines whether any of the broadcast signal(s) is a beacon signal carrying the predetermined data (e.g., an SSID conforming to a specific protocol), and learns that the second wireless device 220 broadcasts the beacon signal to request the first wireless device 210 to help it establish connection.

step S150: the first wireless device 210 wirelessly disconnecting the target wireless device 200 and then wirelessly connecting to the second wireless device 220. Step S150 follows step S140.

step S160: the first wireless device 210 transmitting the profile data of the target wireless device 200 to the second wireless device 220 and then wirelessly disconnecting the second wireless device 220. Step S160 follows step S150.

step S170: the first wireless device 210 repeating a procedure for wirelessly connecting to the target wireless device and disconnecting the target wireless device N time(s) so as to allow the second wireless device 220 to acquire a plurality of packets including raw data of the SSID of the target wireless device 200 in accordance with the profile data of the target wireless device 200, wherein the N is a positive integer, the plurality of packets are generated for the communication between the first wireless device 210 and the target wireless device 200 in order to establish the connection therebetween, and the raw data of the SSID of the target wireless device 200 are not available to or correctly retrieved by the aforementioned application program executed by the first wireless device 210. Step S170 follows step S160. In an exemplary implementation, the second wireless device 220 finds the plurality of packets among its received packets in accordance with the BSSID of the target wireless device 200. In another exemplary implementation, the plurality of packets include: a probe request packet from the first wireless device 210; and one of a probe response packet and an association request packet from the target wireless device 200, wherein each of the probe request packet, the probe response packet, and the association request packet along is common in this technical field. In yet another exemplary implementation, the N is equal to or greater than three.

step S180: the second wireless device 220 obtaining raw data of the SSID of the target wireless device 200 according to content of the plurality of packets and then wirelessly connecting to the target wireless device 200 according to the profile data of the target wireless device 200 and the raw data of the SSID.

step S190: the second wireless device 220 transmitting a connection success message to the first wireless device 210 via the target wireless device 200. This step is used to prevent the first wireless device 210 from keeping trying to help the second wireless device 220 establish connection. However, this step is optional, and if this step is omitted, the first wireless device 210 may stop helping the second wireless device 220 establish connection once a predetermined condition (e.g., a condition that the execution of step S170 is finished and/or the beacon signals of the second wireless device 220 are not received anymore) is satisfied.

Figure 3:
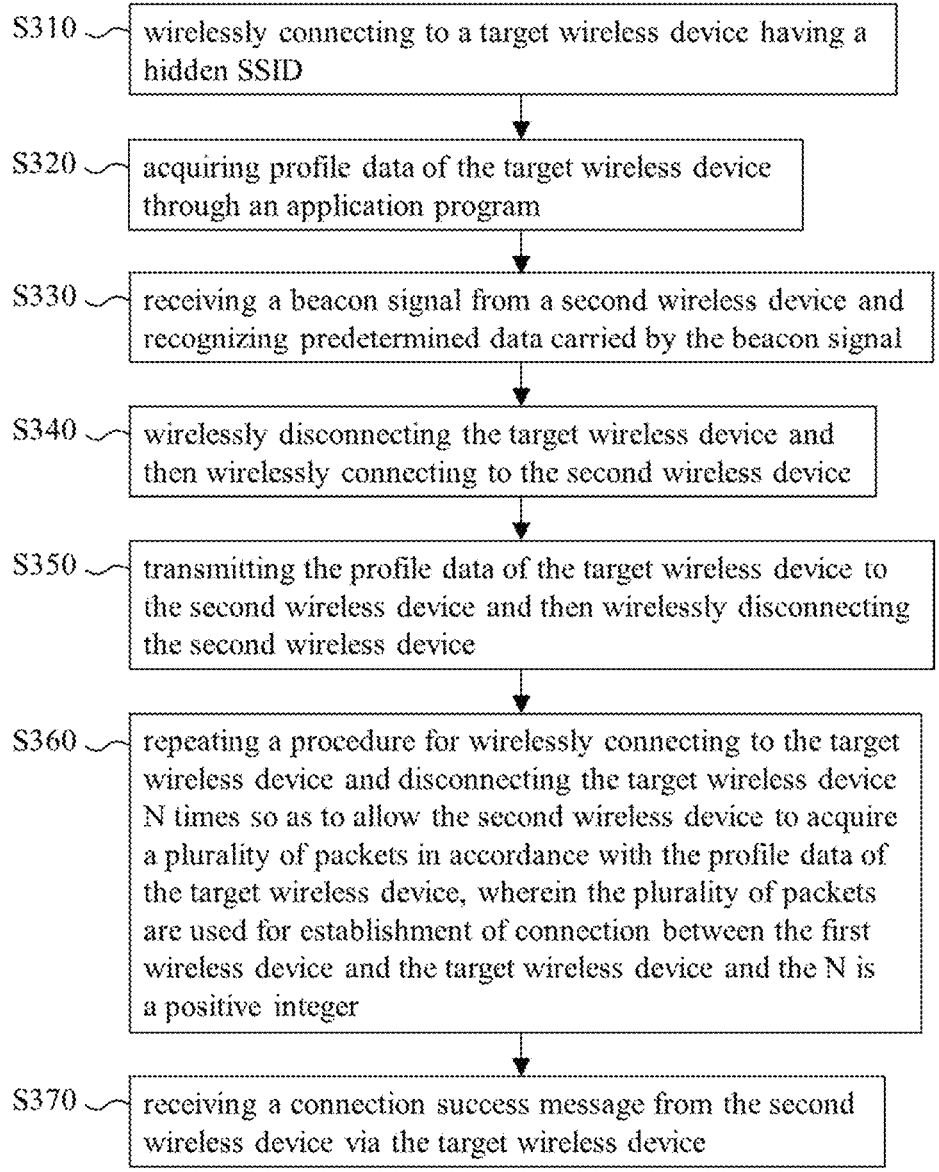
FIG. 3 shows another embodiment of the wireless profile sharing method of the present disclosure.

FIG. 3 shows another embodiment of the wireless profile sharing method of the present disclosure. This embodiment is carried out by a first wireless device (e.g., a mobile device or a personal computer) and includes the following steps:

step S310: wirelessly connecting to a target wireless device (e.g., an access point) having a hidden SSID.

step S320: acquiring profile data of the target wireless device through an application program.

step S330: receiving a beacon signal from a second wireless device (e.g., a wireless network device such as a wireless speaker or an IoT device) and recognizing predetermined data carried by the beacon signal.

step S340: wirelessly disconnecting the target wireless device and then wirelessly connecting to the second wireless device.

step S350: transmitting the profile data of the target wireless device to the second wireless device and then wirelessly disconnecting the second wireless device.

step S360: repeating a procedure for wirelessly connecting to the target wireless device and disconnecting the target wireless device N times so as to allow the second wireless device to acquire a plurality of packets including raw data of the SSID of the target wireless device in accordance with the profile data of the target wireless device, wherein the plurality of packets are used for establishment of connection between the first wireless device and the target wireless device, the N is a positive integer, and the raw data of the SSID of the target wireless device are not available to or correctly retrieved by the application program executed by the first wireless device.

step S370: receiving a connection success message from the second wireless device via the target wireless device.

Since those of ordinary skill in the art can appreciate the detail and modifications of the embodiment of FIG. 3 by referring to the disclosure of the embodiment of FIG. 1, which implies that some or all of the features of the embodiment of FIG. 1 can be applied to the embodiment of FIG. 3 in a reasonable way, repeated and redundant description is omitted here.

Figure 4:
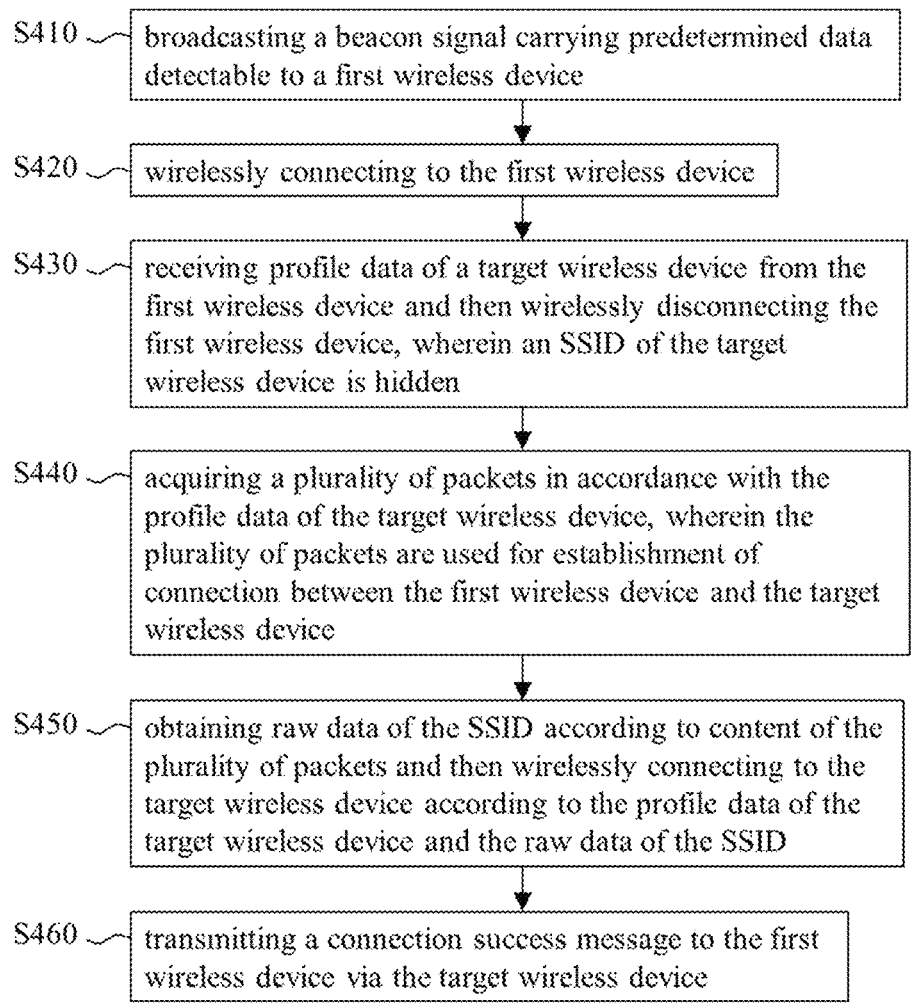
FIG. 4 shows yet another embodiment of the wireless profile sharing method of the present disclosure.

FIG. 4 shows another embodiment of the wireless profile sharing method of the present disclosure. This embodiment is carried out by a second wireless device (e.g., a wireless network device such as a wireless speaker or an IoT device) and includes the following steps:

step S410: broadcasting a beacon signal carrying predetermined data detectable to a first wireless device (e.g., a mobile device or a personal computer).

step S420: wirelessly connecting to the first wireless device.

step S430: receiving profile data of a target wireless device (e.g., an AP) from the first wireless device and then wirelessly disconnecting the first wireless device, wherein an SSID of the target wireless device is hidden.

step S440: acquiring a plurality of packets including raw data of the SSID of the target wireless device in accordance with the profile data of the target wireless device, wherein the plurality of packets are used for establishment of connection between the first wireless device and the target wireless device.

step S450: obtaining raw data of the SSID according to content of the plurality of packets and then wirelessly connecting to the target wireless device according to the profile data of the target wireless device and the raw data of the SSID.

step S460: transmitting a connection success message to the first wireless device via the target wireless device.

Since those of ordinary skill in the art can appreciate the detail and modifications of the embodiment of FIG. 4 by referring to the disclosure of the embodiment of FIG. 1, which implies that some or all of the features of the embodiment of FIG. 1 can be applied to the embodiment of FIG. 4 in a reasonable way, repeated and redundant description is omitted here.

It should be noted that people of ordinary skill in the art can implement the present method by selectively using some or all of the features of any embodiment in this specification or selectively using some or all of the features of multiple embodiments in this specification as long as such implementation is practicable, which implies that the present method can be carried out flexibly.

To sum up, the present method allows a wireless network device to successfully connect to a target wireless device having a hidden SSID even though the hidden SSID is not an ASCII code. Accordingly, compared with the prior art, the present method can improve the connection capability of the wireless network device no matter how the SSID of the target wireless device is encoded.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A method for a plurality of wireless devices including a target wireless device, a first wireless device, and a second wireless device, the method comprising:

wirelessly connecting by the first wireless device to the target wireless device, a service set identifier (SSID) of the target wireless device being hidden;

executing, by the first wireless device, an application program to acquire profile data of the target wireless device;

broadcasting, by the second wireless device, a beacon signal carrying predetermined data;

receiving the beacon signal and recognizing the predetermined data by the first wireless device;

wirelessly disconnecting the target wireless device and then wirelessly connecting to the second wireless device by the first wireless device;

transmitting the profile data of the target wireless device to the second wireless device and then wirelessly disconnecting the second wireless device by the first wireless device;

repeating by the first wireless device a procedure for wirelessly connecting to the target wireless device and disconnecting by the first wireless device the target wireless device N time(s) so as to allow the second wireless device to acquire a plurality of packets in accordance with the profile data of the target wireless device, the plurality of packets being used for establishment of connection between the first wireless device and the target wireless device and the N being a positive integer; and obtaining by the second wireless device raw data of the SSID according to content of the plurality of packets and then wirelessly connecting by the second wireless device to the target wireless device according to the profile data of the target wireless device and the raw data of the SSID.

2. The method of claim 1, wherein the second wireless device transmits a connection success message to the first wireless device via the target wireless device.

3. The method of claim 1, wherein the SSID is not an ASCII (American Standard Code for Information Interchange) code.

4. The method of claim 1, wherein the profile data of the target wireless device includes: a basic service set identifier (BSSID) of the target wireless device; information indicating that the SSID is hidden; and a connection password of the target wireless device.

5. The method of claim 4, wherein the second wireless device acquires the plurality of packets in accordance with the BSSID.

6. The method of claim 1, wherein the plurality of packets include: a probe request packet; and one of a probe response packet and an association request packet.

7. The method of claim 1, wherein the N is equal to or greater than three.

8. The method of claim 1, wherein the target wireless device is an access point (AP), the first wireless device has the profile data of the target wireless device and connects to the target wireless device, and the second wireless device does not have the profile data of the target wireless device until the second wireless device receives the profile data of the target wireless device from the first wireless device.

9. The method of claim 1, wherein each of the target wireless device, the first wireless device, and the second wireless device conforms to at least one of a series of IEEE 802.11 standards.

10. The method of claim 1, wherein the predetermined data is a specific SSID.

11. A method carried out by a first wireless device, the method comprising:

wirelessly connecting to a target wireless device, wherein a service set identifier (SSID) of the target wireless device is hidden;

acquiring profile data of the target wireless device through an application program;

receiving a beacon signal from a second wireless device and recognizing predetermined data carried by the beacon signal;

wirelessly disconnecting the target wireless device and then wirelessly connecting to the second wireless device;

transmitting the profile data of the target wireless device to the second wireless device and then wirelessly disconnecting the second wireless device; and repeating a procedure for wirelessly connecting to the target wireless device and disconnecting the target wireless device N times so as to allow the second wireless device to acquire a plurality of packets in accordance with the profile data of the target wireless device, wherein the plurality of packets are used for establishment of connection between the first wireless device and the target wireless device and the N is a positive integer.

12. The method of claim 11, further comprising receiving a connection success message from the second wireless device via the target wireless device.

13. The method of claim 11, wherein the SSID is not an ASCII (American Standard Code for Information Interchange) code.

14. The method of claim 11, wherein the profile data of the target wireless device includes: a basic service set identifier (BSSID) of the target wireless device; information indicating that the SSID is hidden; and a connection password of the target wireless device.

15. The method of claim 11, wherein the N is equal to or greater than three.

16. The method of claim 11, wherein the plurality of packets include raw data of the SSID.

17. A method carried out by a second wireless device, the method comprising:

broadcasting a beacon signal carrying predetermined data detectable to a first wireless device;

wirelessly connecting to the first wireless device;

receiving profile data of a target wireless device from the first wireless device and then wirelessly disconnecting the first wireless device, wherein a service set identifier (SSID) of the target wireless device is hidden;

acquiring a plurality of packets in accordance with the profile data of the target wireless device, wherein the plurality of packets are used for establishment of connection between the first wireless device and the target wireless device; and obtaining raw data of the SSID according to content of the plurality of packets and then wirelessly connecting to the target wireless device according to the profile data of the target wireless device and the raw data of the SSID.

18. The method of claim 17, further comprising transmitting a connection success message to the first wireless device via the target wireless device.

19. The method of claim 17, wherein the SSID is not an ASCII (American Standard Code for Information Interchange) code.

20. The method of claim 17, wherein the profile data of the target wireless device includes: a basic service set identifier (BSSID) of the target wireless device; information indicating that the SSID is hidden; and a connection password of the target wireless device.

* * * * *